United States Patent [19]

Schmidt

[11] Patent Number: 4,933,881
[45] Date of Patent: Jun. 12, 1990

[54] VARIABLE SPEED FILM TRANSPORT INTERLOCK SYSTEM

[75] Inventor: Jon C. Schmidt, Evanston, Ill.

[73] Assignee: Universal Recording Corporation, Chicago, Ill.

[21] Appl. No.: 297,250

[22] Filed: Jan. 13, 1989

Related U.S. Application Data

[63] Continuation-in-part of Ser. No. 79,705, Jul. 30, 1987.

[51] Int. Cl.$^5$ .......................... G02B 1/00; G06F 15/20; H02P 5/46
[52] U.S. Cl. ................................. 364/525; 364/565; 352/12; 360/79
[58] Field of Search ............... 364/525, 565, 200, 900, 364/469, 138, 189, 166; 352/232, 12, 9, 14, 21, 22, 25, 133, 180, 199; 318/85, 49, 268; 360/80, 79

[56] References Cited

U.S. PATENT DOCUMENTS

| | | | |
|---|---|---|---|
| 2,993,408 | 7/1961 | Cook | 360/80 |
| 3,230,307 | 1/1966 | Bounsall | 178/6.6 |
| 3,463,877 | 8/1969 | Crum | 178/6.6 |
| 3,662,121 | 5/1972 | Cruger | 360/79 |
| 3,691,544 | 9/1972 | Gallina | 360/79 |
| 3,707,253 | 12/1972 | Brill et al. | 352/180 |
| 3,740,125 | 6/1973 | Harris | 352/17 |
| 3,751,142 | 8/1973 | Roller | 352/12 |
| 3,772,473 | 11/1973 | Parham | 360/80 |
| 3,804,497 | 4/1974 | Ogiso et al. | 352/17 |
| 3,856,389 | 12/1974 | Gardner | 352/129 |
| 3,912,383 | 10/1975 | Stutz | 352/180 |
| 3,926,511 | 12/1975 | Gendrot et al. | 352/12 |
| 3,938,194 | 2/1976 | Freudenschuss | 360/80 |
| 3,979,774 | 9/1976 | Chen et al. | 360/80 |
| 4,050,794 | 9/1977 | Shields, Jr. | 352/12 |
| 4,115,824 | 9/1978 | Mindell | 360/80 |
| 4,214,278 | 7/1980 | Hunt et al. | 360/14 |
| 4,215,920 | 8/1980 | Butler | 352/92 |
| 4,281,388 | 7/1981 | Friend et al. | 364/565 |
| 4,363,048 | 12/1982 | Tanaka et al. | 360/137 |
| 4,405,217 | 9/1983 | Brant | 352/180 |
| 4,427,292 | 1/1984 | Buchanan | 364/525 |
| 4,491,879 | 1/1985 | Fine | 360/14.1 |
| 4,553,176 | 11/1985 | Mendrala | 358/334 |
| 4,578,755 | 3/1986 | Quinn et al. | 364/565 |
| 4,587,572 | 5/1986 | DiGiulio | 360/17 |
| 4,639,884 | 1/1987 | Saques | 364/565 |
| 4,719,575 | 1/1988 | Gnuechtel | 364/469 |
| 4,815,013 | 3/1989 | Schmidt | 364/525 |

FOREIGN PATENT DOCUMENTS

| | | | |
|---|---|---|---|
| 202073 | 11/1986 | European Pat. Off. | 364/525 |
| 2518685 | 4/1977 | Fed. Rep. of Germany . | |
| 3343688 | 6/1984 | Fed. Rep. of Germany | 364/525 |
| 3406143 | 8/1985 | Fed. Rep. of Germany | 364/525 |
| 159510 | 2/1979 | Netherlands | 352/180 |

OTHER PUBLICATIONS

"A Microprocessor Controlled Computer Tachometer", Zeiss-Inform No. 25, Sep. 1981, pp. 26-51.

Primary Examiner—Parshotam S. Lall
Assistant Examiner—Ellis B. Ramirez
Attorney, Agent, or Firm—Welsh & Katz, Ltd.

[57] ABSTRACT

A variable speed film transport interlock control system for allowing a plurality of film audio elements to be run in synchronization with each other with at least one film element running at a different selected speed than the other elements and permitting internal generation of quadrature control signals by an internal microprocessor. The system generates a modified drive signal from a selected standard system drive signal or microcomputer generated signal such that the modified signal corresponds to a speed with a fixed ratio to the speed of the selected unprocessed drive signal under all operating conditions. This permits the modified signal to drive a film transport device, such as a recorder or reproducer, at a different speed than other transport devices while maintaining synchronization with the other devices during forward or reverse, stopping and starting, high speed or low speed operation. In addition, the internal generation of quadrature signals enables the system operator to independently advance or reverse film transport devices to permit searching for a preselected cue point.

23 Claims, 12 Drawing Sheets

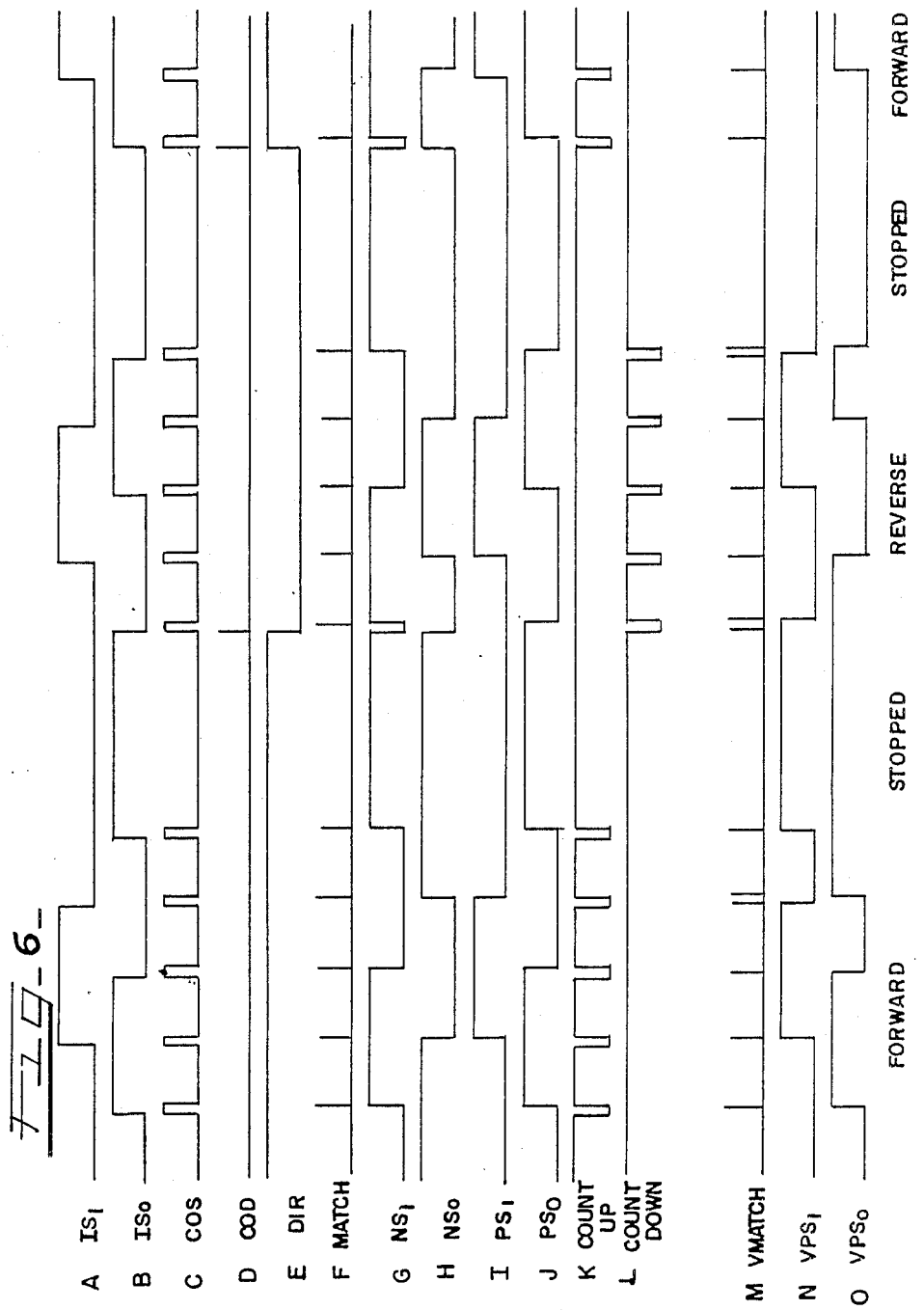

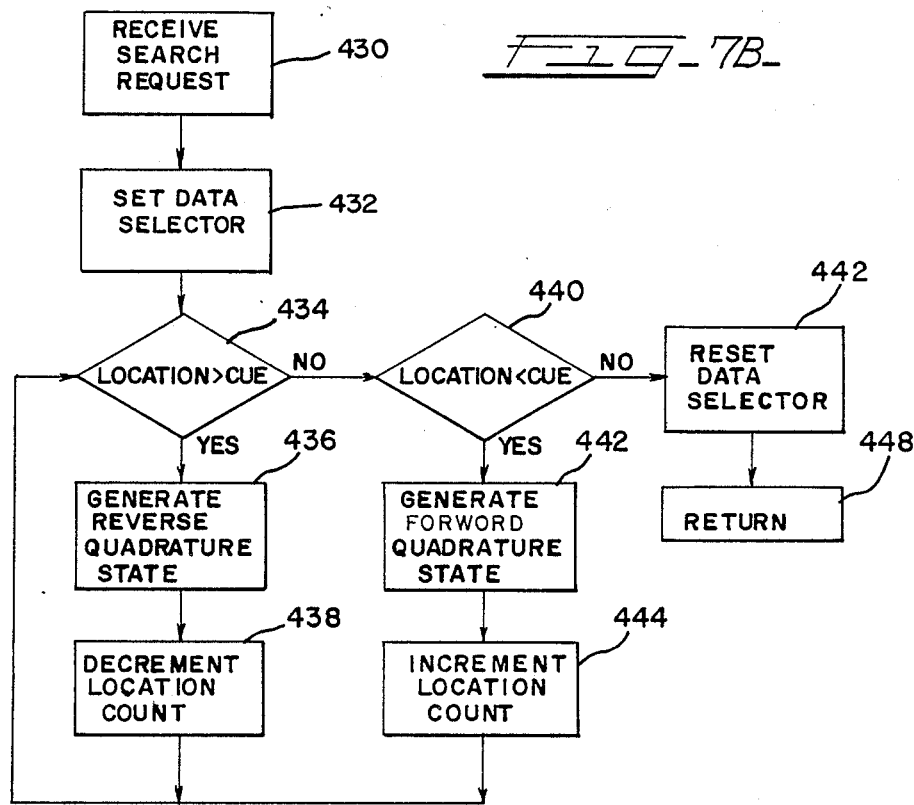
FIG_7B

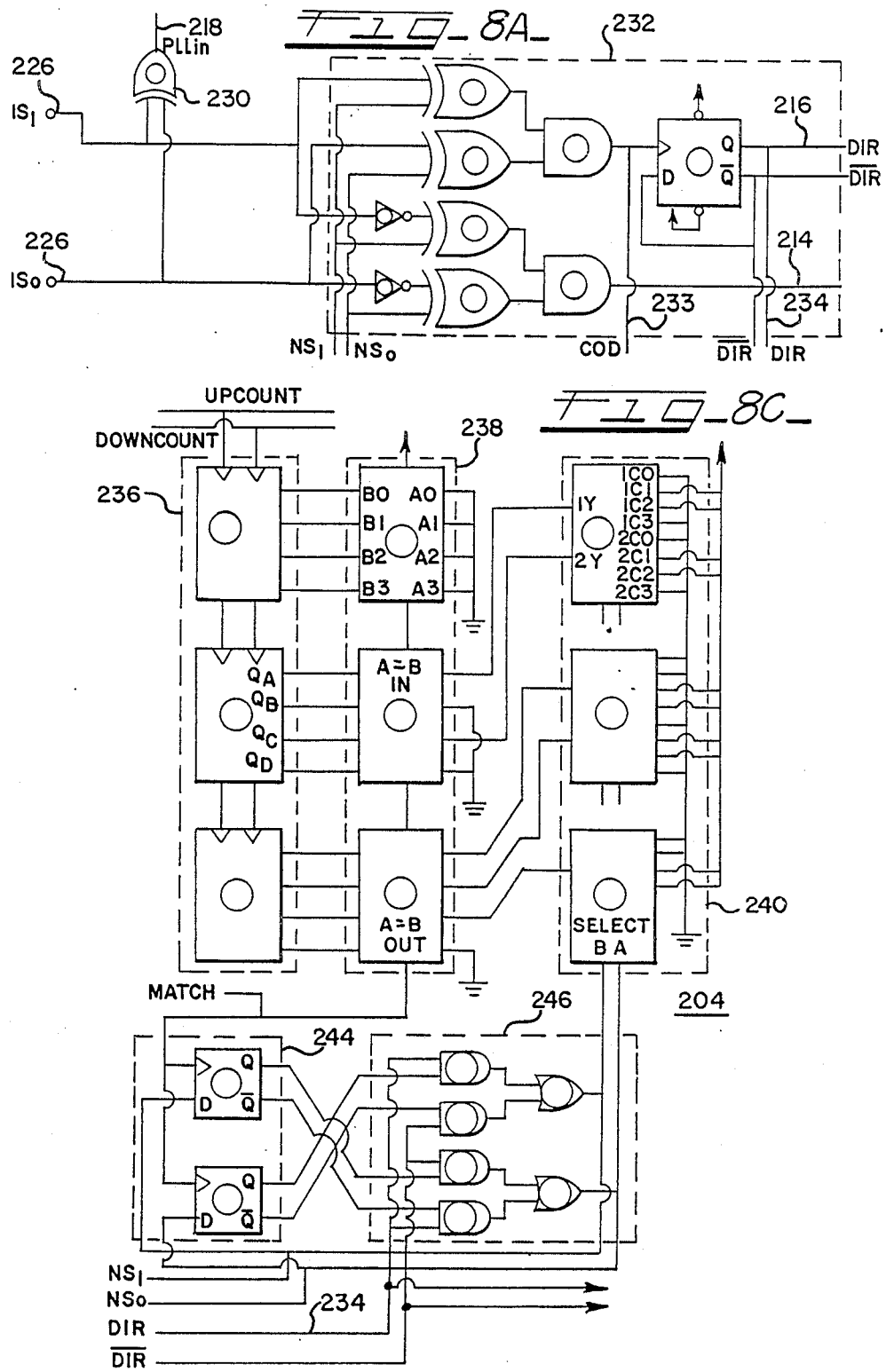

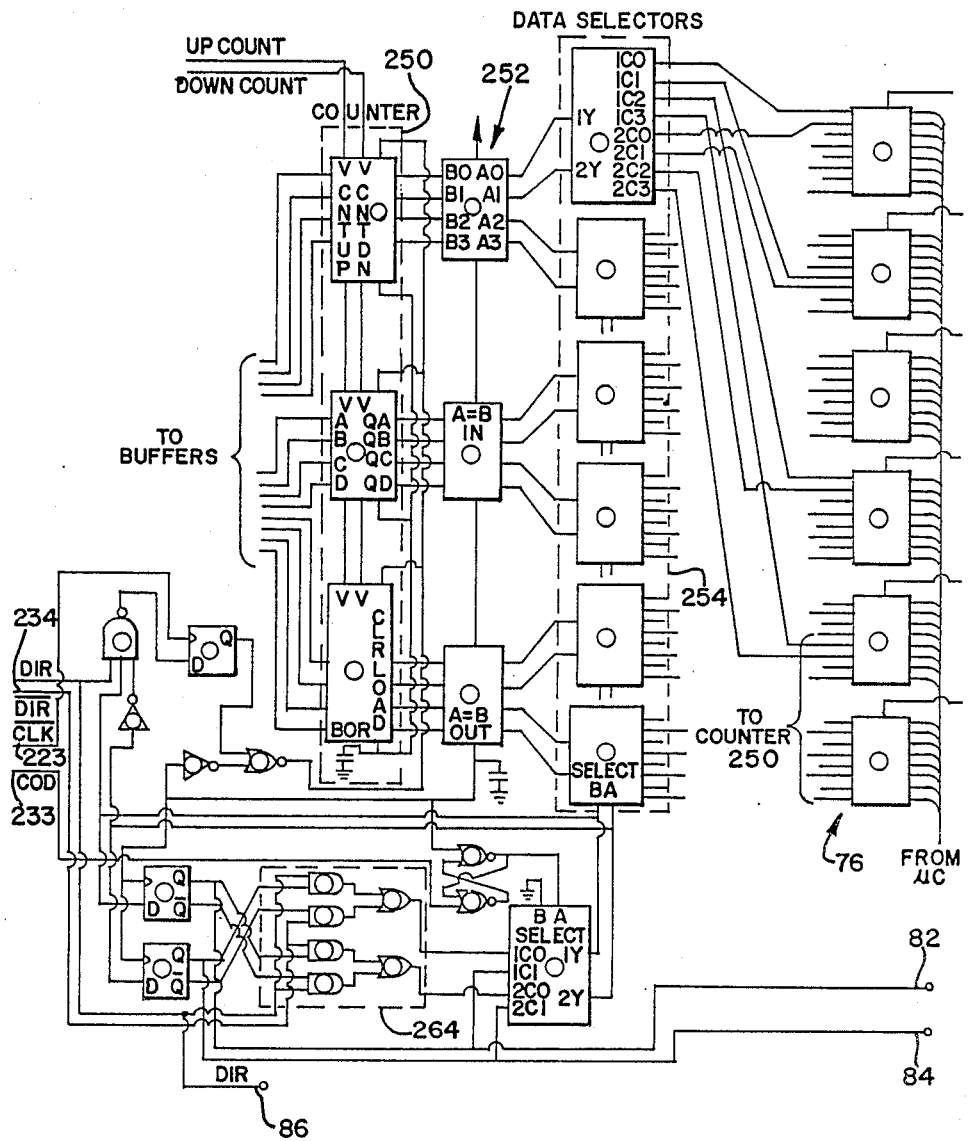
FIG_8D

VARIABLE SPEED FILM TRANSPORT INTERLOCK SYSTEM

This is a continuation-in-part of application Ser. No. 079,705, filed July 30, 1987.

This invention relates generally to the field of motion picture and sound track film control systems and more particularly to a microcomputer controlled variable speed interlock system for operating a plurality of film transport devices at different frame rates while maintaining synchronization between the plurality of film transport devices under all operating conditions and for providing internally generated quadrature signals.

In general, prior art film transport control systems used for motion picture sound track mixing and editing utilize various remote control centers which feed into a master control device. The master control device generates drive signals in response to remote control signals which are coupled to various film transport devices, such as reproducers and recorders, to control the transport of film elements mounted on the transport devices. The drive signals are typically quadrature, or alternatively tachometer and direction signals, which control a stepper motor within each transport device. This system configuration insures that the transport device stays in synchronization with each of the other transport devices as the film elements are moved back and forth during a typical mixing/editing session.

Unfortunately, these prior art film transport systems do not allow film elements on different transport devices to be played at any speed except the one speed dictated by the master control device. Nevertheless, the need does arise for playing a film element at a different speed while still maintaining synchronization between various transport devices. Thus, for example, a film element originally recorded at a conventional motion picture frame rate of 24 frames per second and a film element originally recorded at a conventional video frame rate of 30 frames per second might be used in a single editing session. Therefore, in the prior art, when various frame rate film elements are needed, it is not possible to run them at different speeds while maintaining the required synchronization. The odd frame rate element must therefore first be transferred to a standard frame rate film before starting a mixing/editing session. This increases expense and sacrifices both time and audio quality. In addition, it is often desirable to independently control transport devices to advance or retard a device independent of the rest of the system to permit, for example, cuing up of an audio program (e.g., a sound effect).

It is accordingly an object of this invention to provide a novel film transport interlock system which permits film transport devices to run independently of the system or to run at different selected frame rates while maintaining synchronization during all operating modes including play, fast forward, rewind and jog, stopping and starting, etc.

It is yet another object of the present invention to provide a novel variable speed film transport interlock system for operating various quadrature drive signal controlled film transport devices at different selected frame rates utilizing microcomputer generated quadrature signals.

It is yet another object of the invention to provide a novel variable speed film transport interlock system for operating transport devices using tachometer and direction drive signals at different selected frame rates while maintaining synchronization between the various devices during all operating conditions and utilizing circuitry to ensure a 90% duty cycle.

It is yet another object of the invention to provide a novel film transport interlock system having a microcomputer control to enhance ease of operation and permit independent generation of quadrature input and output signals.

Briefly, according to one embodiment of the invention, a variable speed film transport interlock control system is provided for controlling a plurality of film transport devices. The system comprises means for generating standard film transport control signals of a selected characteristic speed to control film transport devices, a microcomputer for generating predetermined computed quadrature film transport control signals of a selected characteristic speed, means for selecting one of the film transport control signals, and means for processing the selected film transport control signals to generate processed transport control signals having a selected speed different than the characteristic speed while maintaining synchronization with the selected film transport control signal. The system also comprises means for coupling the selected film transport control signals to at least one selected film transport device to drive said device at the characteristic speed and for coupling the processed transport control signals to at least one other selected film transport device to drive said other device at the selected speed.

BRIEF DESCRIPTION OF THE DRAWINGS

The invention, together with further objects and advantages thereof, may be understood by reference to the following description taken in conjunction with the accompanying drawings.

FIG. 6 is an illustration of various waveforms generated by the circuitry shown in FIG. 4A.

FIG. 7B is a generalized flow diagram of a specific embodiment of a program for generation of quadrature signals for the microcomputer shown in FIG. 2.

FIGS. 8A, 8B, 8C and 8D are detailed schematic diagrams of a specific embodiment of the quadrature variable speed interlock circuitry of FIG. 4A.

DETAILED DESCRIPTION OF THE PREFERRED EMBODIMENT

Figure 1:
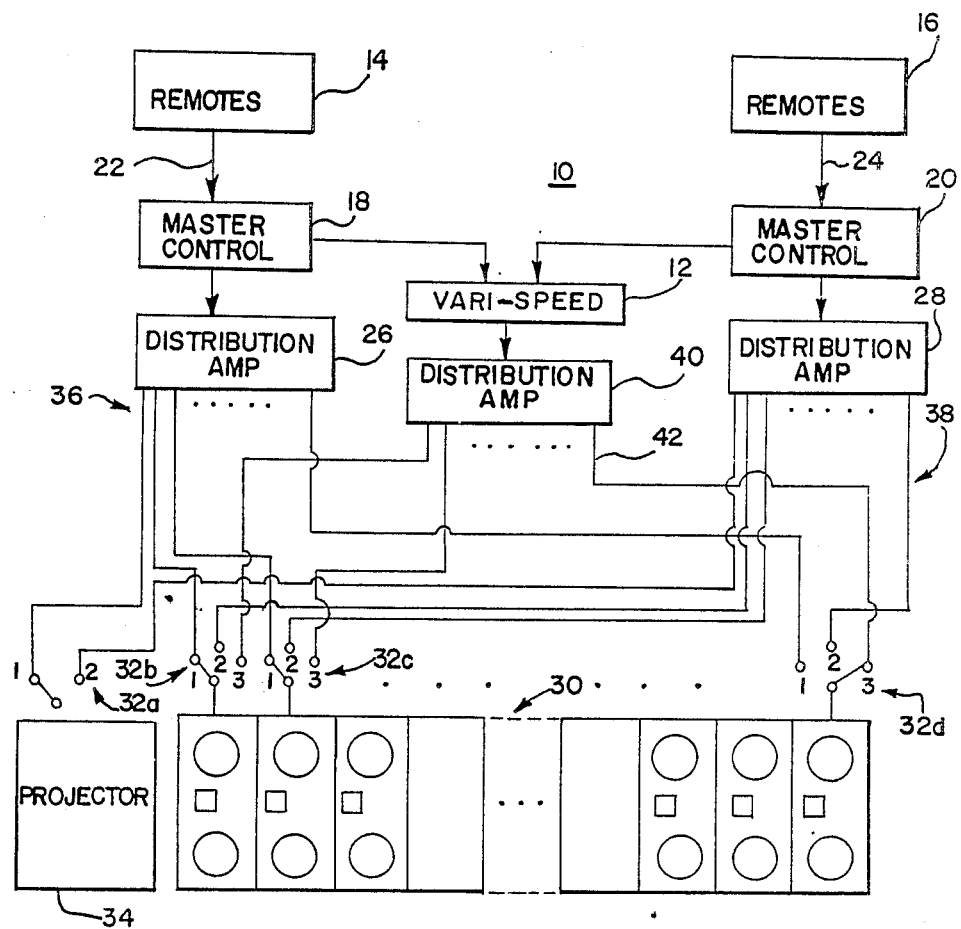
FIG. 1 is a generalized block diagram illustrating a specific embodiment of a film control system incorporating a specific embodiment of a variable speed film transport interlock system according to the invention.

Referring now to FIG. 1, there is shown a generalized block diagram illustrating a film transport control system 10 for mixing and editing various audio film elements which incorporates a variable speed film transport interlock control circuit (vari-speed circuit) 12 according to the invention. The system 10 comprises a plurality of remote control centers 14, 16 from which an operator controls a mixing/editing session. Each remote control center 14, 16 couples remote control signals to a respective master controller 18, 20 (e.g., a Magnatech model 8LB in the illustrated embodiment) via conductors 22, 24, as shown. The master controllers 18, 20, in the illustrated embodiment generate quadrature drive signals comprising two rectangular signals 90° out of phase (i.e., such as waveforms A and B of FIG. 6) which are coupled to distribution amplifiers 26, 28 and to the vari-speed circuit 12, as shown. The distribution amplifiers 26, 28 function as buffer amplifiers coupling the quadrature drive signal via distribution buses 36, 38 to a plurality of film element transport devices such as reproducers and recorders 30 (only a limited number shown) through bus selection switches 32a-d. Thus, each film transport device may be connected to each distribution amplifier through the bus selection switches.

The quadrature drive signal provides speed and direction control to drive a stepper motor (not shown) in each reproducer or recorder 30, thereby moving the film elements mounted thereon at the desired speed and in the desired direction. The quadrature drive signals from the distribution amplifiers 26, 28 are also coupled through a bus selection switch 32a to a film projector 34. The quadrature signal coupled to the vari-speed circuit 12 is processed and coupled to a distribution amplifier 40 which couples the processed quadrature drive signal to the reproducers and recorders 30 via a distribution bus 42, as shown. The vari-speed circuit 12 may also internally generate quadrature drive signals which may then be processed or coupled directly to the reproducers and recorders 30.

In a typical mixing session, the operator in, for example, the remote control center 14, controls various film audio elements which are mounted on the reproducers 30 which provide a play only function. In addition, the recorders are used to record the mixed audio tracks generated during a mixing/editing session. In such a session, movement of the film elements on the reproducers and recorders 30 is controlled by the quadrature drive signal generated by, for example, the master controller 18 controlled from the remote control center 14. The quadrature drive signals are coupled through the distribution amplifier 26 to the reproducers and recorders 30 and the projector 34 through the bus selector switches 32a-c, which in the illustrated embodiment, are set to the position 1 to select the distribution bus 36. This arrangement permits the operator to mix and edit film elements by moving the film elements on the reproducers and recorders 30 and projector 34 at a standard play/record speed (e.g., a speed corresponding to a standard film rate of 24 frames per second or a rate of 30 frames per second are typical for conventional master controllers); by doing high speed rewinds at predetermined high speeds (typically three different fast speeds are available); or by jogging the selected reproducers or recorders at a predetermined reduced speed (e.g., typically 1/10 of the play speed). In each instance, the film elements being moved must be moved in exact synchronization with one another, and thus the quadrature signal to each of the transport devices must be the same signal in conventional systems (i.e., each reproducer and recorder for a session is normally connected to the same distribution bus).

Unfortunately, such conventional systems do not permit operating one or more of the film transport devices 30 at a different speed than the rest while still maintaining the necessary synchronization with the other machines. This capability is useful, for example, when an audio film element is slightly longer than required. By running that film element at a slightly increased speed, synchronized with the other machines, and then pitch correcting the results before recording, the audio film element can be shortened. It is also sometimes occurs that one or more of the film elements is recorded at a different frame rate than the rest of the film element. For example, most film elements may use the standard film frame rate of 24 frames per second, while one or more film elements may use the standard television frame rate of 30 frames per second. It is desirable to be able to run such a film element at the 30 frames per second rate while still maintaining synchronization with the other transport devices.

In the illustrated system 10, such variable speed synchronization is made possible by the vari-speed circuit 12. The vari-speed circuit 12 processes the quadrature drive signal from the master controller 18 generating an output quadrature signal (e.g., see waveforms N and O shown in FIG. 6) at a selected new speed, but synchronized with the input quadrature signal at a fixed selected ratio between the input quadrature signal speed and the output quadrature signal speed under all operating conditions (e.g., a ratio of 1.25 to convert the input rate of 24 frames per second to an output rate of 30 frames per second). Thus, whether the system is operating in forward or reverse, normal, increased or reduced speed, stopping or starting the output quadrature signal speed is maintained at the fixed ratio to the input quadrature signal speed.

This output quadrature drive signal is then coupled through the distribution amplifier 40 to the selected reproducer 30 by selecting the appropriate bus selection switch 32d to select the distribution bus 42. As a result, whether the film transport system is operating to play back film elements, rewind or fast-forward at high speed, or jog at low speed, the speed of the quadrature drive signal from the vari-speed circuit 12 is maintained at a fixed selected ratio to the speed of the quadrature signal from the master controller 18. This permits the film transport devices 30 controlled directly by the master controller 18 to be maintained in synchronization under all operating conditions with the film transport devices receiving drive signals processed by the vari-speed circuit 12.

At the operator's option, the vari-speed circuit 21 may also generate forward or reverse quadrature signals internally which are independent of the master controller. This permits the operator to move particular film transport devices forward or in reverse relative to the other film transport devices in the system. For example, a particular audio program (e.g., a desired sound effect) may be independently cued up by the operator by selecting the vari-speed quadrature generation option.

Optionally, the vari-speed circuit 12 may also be utilized in a transport control system in which a tachometer (tach) and direction drive signal is used instead of a quadrature drive signal. In such systems, the master controller generates a tachometer signal as the speed signal which is composed of pulses at a rate which determines the speed at which the transport device will be driven. In addition, a direction signal is generated which is a voltage level which controls the direction (i.e., forward or reverse). The vari-speed circuit 12 comprises circuitry for converting the tachometer and direction signals into quadrature signals which are processed by the vari-speed quadrature processing circuitry as quadrature signals to produce new quadrature signals at the new selected speed. The new quadrature signals are then reconverted into tachometer and direction signals. These tachometer and direction signals are then coupled to the appropriate film transport devices to control them while maintaining synchronization.

Figure 2:
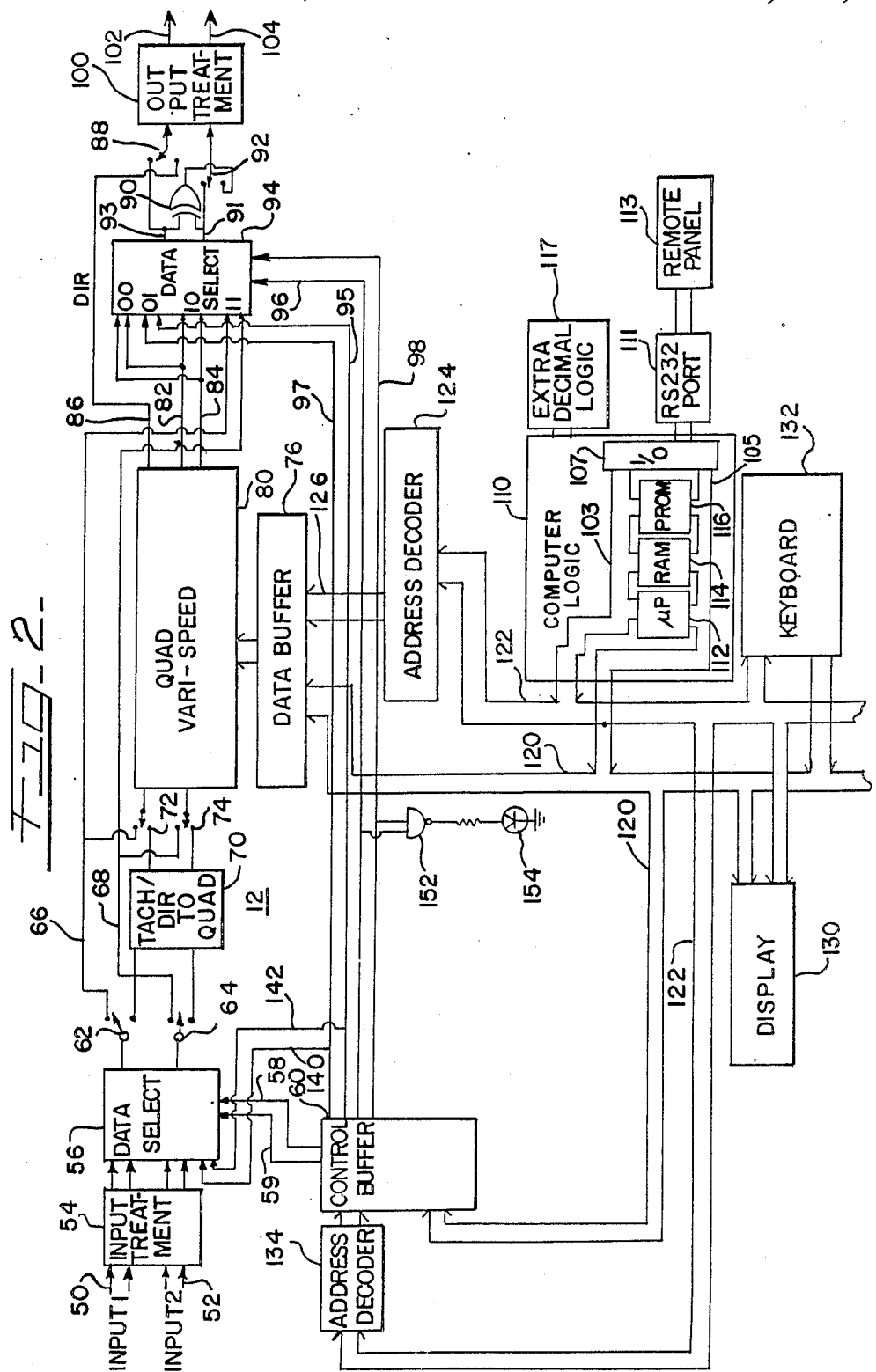
FIG. 2 is a block diagram of a specific embodiment of the variable speed interlock system according to the invention.

FIG. 2 is a block diagram illustrating a specific embodiment of the vari-speed circuit 12 shown in FIG. 1. The input drive signals are coupled to either of two input ports 50, 52, each comprising two conductors, which couple the input signals to an input treatment circuit 54. The input treatment circuit primarily comprises diode protection, RC noise filtering, and Schmitt trigger circuits to shape the waveform. The input signals are coupled from the input treatment circuit 54 to a data selector circuit 56 which permits selection of either the input port 50 or the input port 52 under keyboard 132 control. The data selector control signal which determines the selected input port is coupled from a control buffer 60 via conductor 58 and 59, as shown. In addition, the data selector 56 permits selection of a third port providing computer generated quadrature signals coupled from a microcomputer logic circuit 110 via the control buffer 60 by selection of quadrature signals coupled via conductor 140, 142.

The signal from the selected input port is coupled to a set of selection switches or jumpers 62, 64 which permits selection of a quadrature system when the switches 62, 64 are in the upper switch position or a tachometer and direction based system when the switches are in the lower switch position. If the switches 62, 64 are in the upper position, the signals from the data selector 56 are coupled to conductors 66, 68, and if the switches are in the lower position, the signals are coupled directly to a tachometer and direction to quadrature convertor circuit 70, as shown. The output of the tachometer and direction to quadrature convertor 70 is a quadrature signal coupled to selection switches 72, 74 which apply the quadrature signal from the convertor 70 to the quadrature vari-speed circuit 80 when in the lower position. In the upper position, the switches 72, 74 couple the signals on the conductors 66, 68 directly from the data selector 56 to the quadrature vari-speed circuit 80. Thus the combination of the switches 62, 64 and the switches 72, 74 permit selection of a quadrature input (upper position) or a tachometer and direction input (lower position).

The quadrature vari-speed circuit 80 processes input quadrature signals and produces output quadrature signals with the same direction but at a new speed determined by a vari-speed value coupled from a data buffer 76. The output quadrature signals are in synchronization with the input signal maintaining the same direction with a fixed ratio between the input signal speed and the output signal speed. The output signals are produced on two outputs 82, 84 while a separate direction signal is also generated on an output 86.

The two quadrature outputs 82, 84 of the varispeed circuit 80 are coupled to a data selector 94 at the input port having address 10 and are coupled in reverse order at input port 00, as shown. Also coupled to the data selector 94 at input 11 are direct unprocessed signals from the data selector 56 which have bypassed the vari-speed circuit 80 via the conductors 66 and 68 The computer generated quadrature signals are coupled from the control buffer 60 to the input 01 of the data selector 94 via conductors 97 and 99, as shown. The data selector 94 thus permits selection of any one of the four inputs (i.e., selection of processed quadrature signals, processed quadrature signals in reverse direction, signals which have bypassed processing, or computer generated quadrature signals) to be coupled to the output terminal 91, 93 under keyboard control by control signals coupled from the control buffer 60 via conductors 96, and 98, as shown.

The signals from the output terminals 91, 93 of the data selector 94 are coupled to the upper nodes of selection switches 88 and 92, and to the inputs of an Exclusive-OR gate 90, as shown. The Exclusive-OR gate 90 functions to convert quadrature signals to tachometer signals. The direction signal is coupled via the conductor 86 to the lower node of the selection switch 88 and the output of the Exclusive-OR gate 90 is coupled to the lower node of the selection switch 92. As a result, when the switches 88, 92 are in the upper position quadrature output signals from the data selector 94 are coupled directly on output treatment circuit 100 which buffers the selected signals and couples them to the output 102, 104. When the selection switches 88, 92 are in the lower position, the direction signal from conductor 86 and the output of the Exclusive-OR gate 90 (i.e., direction and tachometer signals) are coupled to the output treatment circuit 100 which buffers the selected signals and couples them to the outputs 102, 104, as shown.

To permit convenient operator control, a microcomputer operator interface is provided comprising primarily microcomputer logic circuitry 110. The microcomputer logic circuitry 110 includes a microcomputer 112 (e.g., a 65C02 microcomputer marketed by Rockwell International), random access memory (RAM) 114, programmable read only memory (PROM) 116 and an input/output (I/O) interface 107 coupled to a data bus 105 and an address bus 103, as shown. The microcomputer logic 110 couples data to a data bus 120 and couples addresses to an address bus 122. The addresses for addressing a data buffer 76 are coupled from the microcomputer logic 110 to an external address decoder 124 via the address bus 122, and data are coupled to the data buffer 76 via the data bus 120. The decoded addressing information is coupled to the data buffer 76 from the address decoder 124 via a bus 126, as shown, to activate the data buffers for loading of data from the data bus 120. In addition, a 18-key keyboard 132 including a conventional keyboard interface provides for convenient operator control by coupling keyed-in data to the computer via the data bus 120 and the address bus 122, as shown. The control buffer 60 is addressed by the microcomputer logic 110 via the address bus 122 which is coupled to an address decoder 134, which decodes addresses to enable the buffer 60 for loading of data coupled from the microcomputer logic 110 via the data bus 120. The control buffer 60 provides storage for data from the microcomputer 110 for control of the data selectors 56 and 94 and provides for coupling of computer generated quadrature signals to the data selectors 56 and 94.

A bypass mode indicator LED 154 is coupled through a NAND gate 152 and a resistor, as shown, to the conductors 96 and 98 to provide an indication of operation in the bypass mode. An RS-232 port 111 may be utilized with the microcomputer logic 110 to permit use of a remote control panel 113. Extra decimal logic 117 may be utilized in conjunction with the microcomputer logic 110 to permit extra decimals of precision in the operation of the varispeed circuit 80 by causing the computer to alternately load two different vari-speed data values into the data buffer 76.

Figure 3:
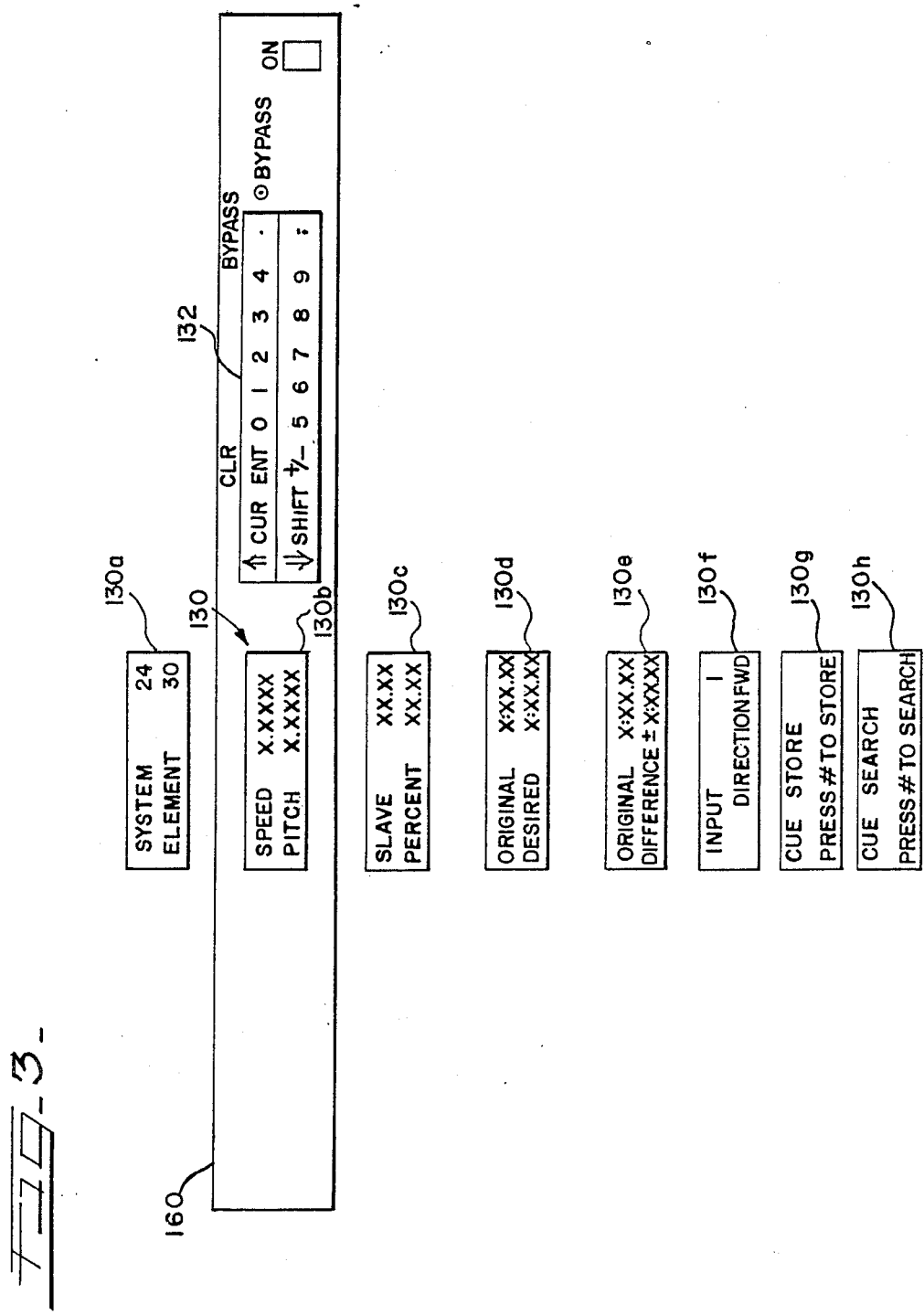
FIG. 3 is an illustration of a specific embodiment of a control and display panel for the variable speed interlock system shown in FIG. 2.

Referring now to FIG. 3, there is shown a specific embodiment of a front panel 160 of the variable speed interlock system of the invention. The panel 160 includes an eighteen key keyboard 132, an LCD display 130, a bypass mode indicator 154, and an on/off switch 156 for turning power on and off. The keyboard 132 and LCD display 130 are coupled into the vari-speed circuit 12 as shown in FIG. 2. The bypass LED indicates when the bypass mode has been selected such that the vari-speed circuit is bypassed permitting signals coupled to the system 12 to pass through unprocessed.

The display 130 provides for a display of various screens 130a-h of information in response to operator selection and data entry. The operator may select any of the screens illustrated by scrolling up or down using the up arrow or down arrow keys shown. Upon selection of a display, the operator may enter desired data values. For example, for the 130b screen shown, the operator may enter speed values using the numerical keys, and using the entry key to enter the data after keying-in the data. The curser key shown is used to select the entry to be made to a selected screen, and the enter key functions as a clear key when the shift key is simultaneously pressed. This mode of operation is used to clear an incomplete data entry before entry is completed. A decimal point key, a colon key, and a sign key (i.e., $\pm$) are also provided, as shown. When the decimal point key and the shift key are simultaneously pressed, the bypass mode is activated.

In the illustrated embodiment of FIG. 3, eight screens are provided. A system/element screen 130a is provided for display and entry of conventional system and element frame rate values. A speed/pitch ratio screen 130b permits display and entry of a desired speed ratio of the element speed to the reproducer speed, and also displays the corresponding ratio of the incoming audio pitch to the outgoing pitch for use in audio pitch change devices. A slave display 130c permits display and entry of a slave frame rate and a percent display provides for display and entry of a percentage difference value. An original/desired screen 130d provides for display and entry of original time duration and desired time duration values, and an original/difference screen 130e provides for display and entry of original and difference time duration values. An input select and slave direction selection screen 130f provides for display and entry of selection of one of the two input ports, and of forward or reverse signal direction.

A cue store screen 130g permits the operator to define any of 10 numbered cue points by pressing a selected one of the numerical keys (indicated by the # sign).

Pressing a selected number stores a quadrature pulse count representing that point in time in a cue location count register designated with the number of the key pressed. A cue search screen 130h then permits the operator to activate a search to a previously stored cue point by pressing the numerical key corresponding to the register with the cue point to be located. This will cause the vari-speed system 12 to generate internally generated quadrature signals to move the desired transport device either forward or in reverse until the selected cue point is reached. The generated quadrature signals will be coupled to the input data selector 56 and through the varispeed circuit 80 if the system 12 is in the vari-speed mode, or otherwise directly to the output via the data selector 94.

Figure 4A:
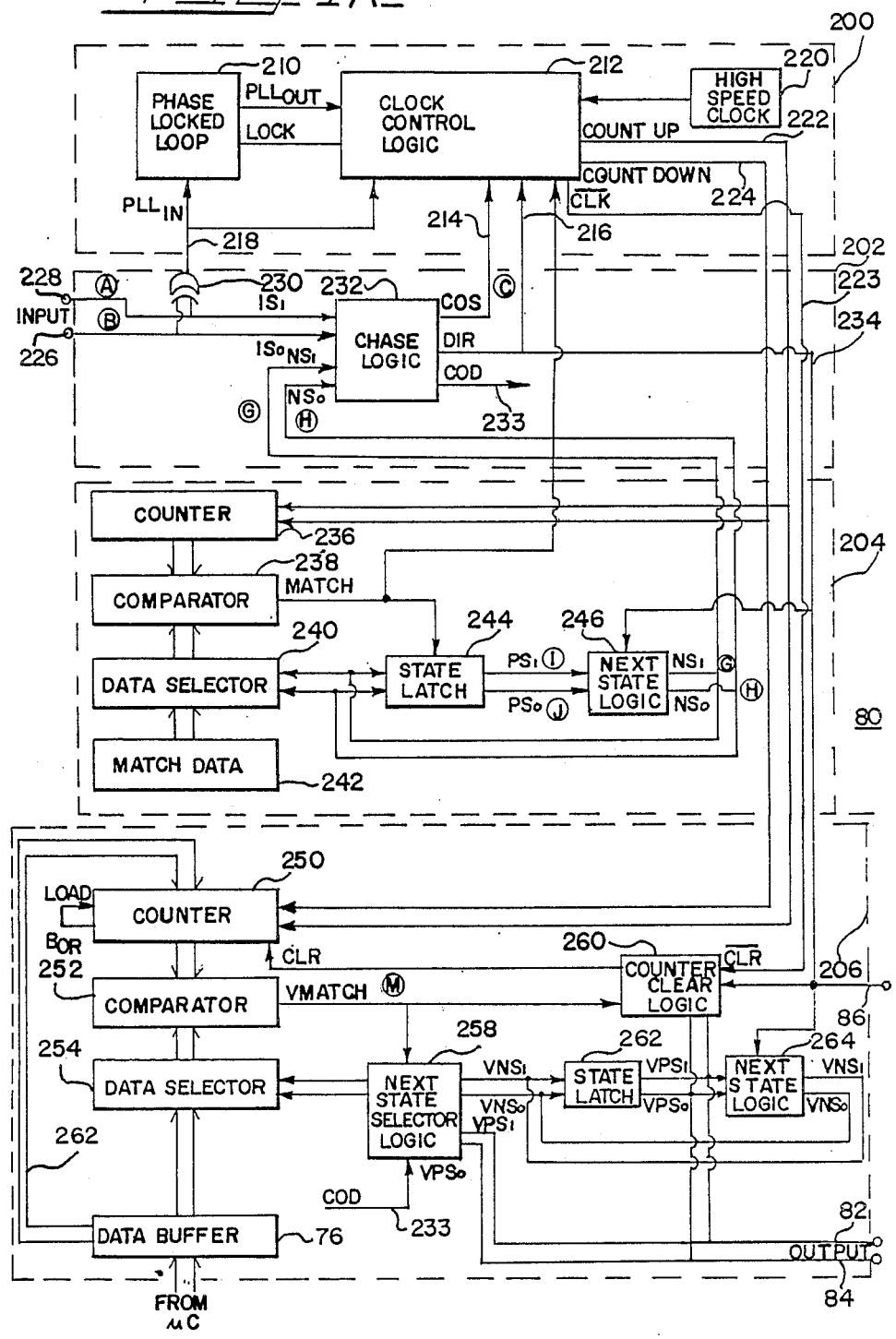
FIG. 4A is a detail block diagram of a specific embodiment of the quadrature variable speed interlock circuitry shown in FIG. 2.
Figure 8B:
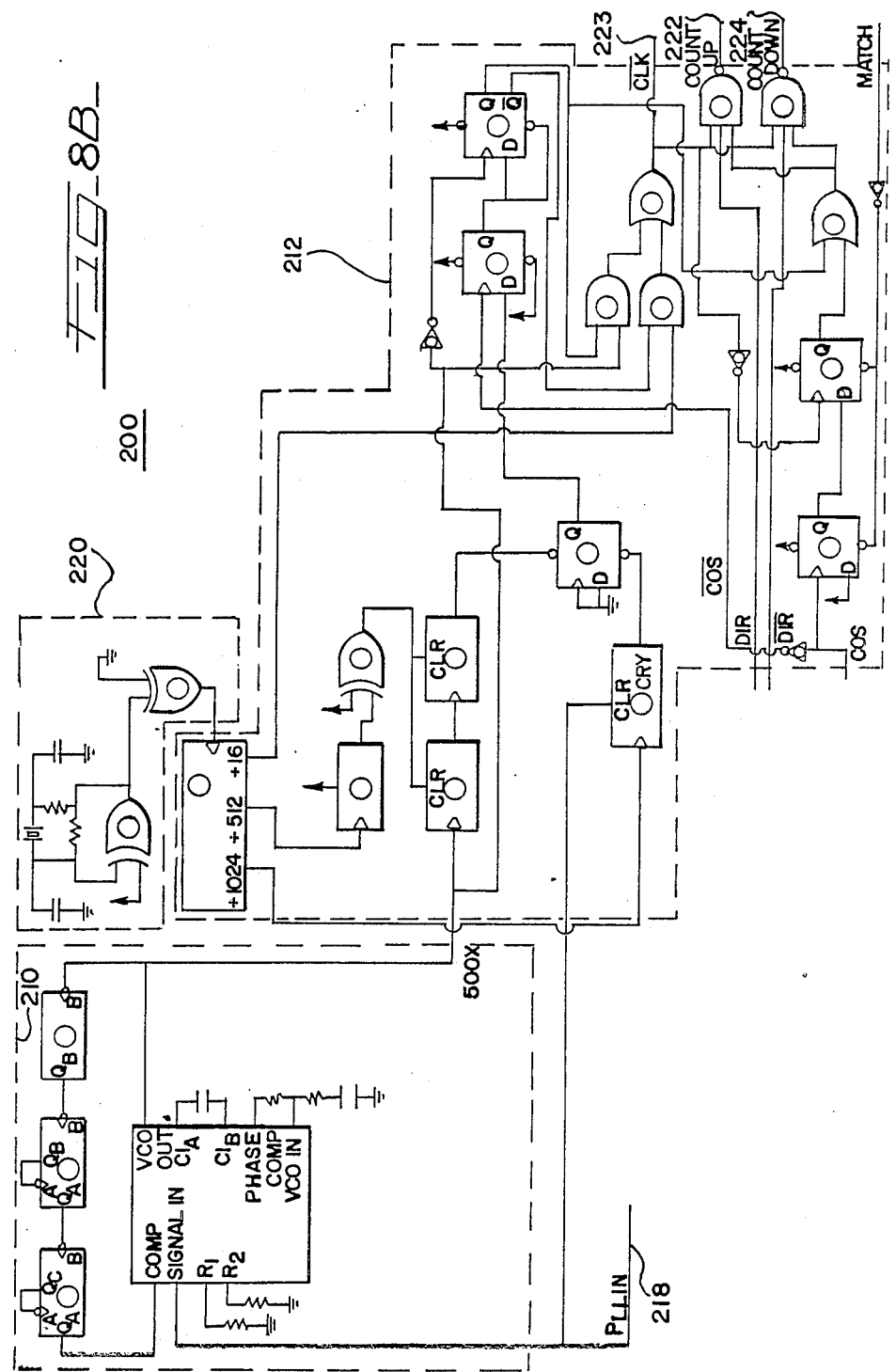

Referring now to FIG. 4A, there is shown a detailed block diagram of a specific embodiment of the quadrature vari-speed interlock circuitry 80. The varispeed circuit 80 comprises four major blocks, including a clock section 200, a chase section 202, and next state section 204 and a vari-speed section 206 configured as shown. The clock section comprises a phase locked loop 210, which couples a phase-locked loop signal to a clock control logic circuit 212, as shown. A change of state signal (COS, see waveform C shown in FIG. 6) and direction signal (DIR, see waveform E shown in FIG. 6) are coupled to the clock control logic circuit 212 from the chase section 202 via conductors 214, 216 and an input phase locked loop signal is coupled from the chase section 202 to the phase locked loop 210 and the clock control logic 212 via a conductor 218, as shown. A clock signal (4.9 megahertz in the illustrated embodiment) is coupled to the clock control logic 212 from a clock generator 220. Count up and count down signals (see waveform K and L shown in FIG. 6) are output from the clock control logic 212 and coupled to the next state section 204, and the vari-speed section 206 via conductors 222, 224. A clock signal $\overline{CLK}$ is coupled from the clock control logic 212 to the vari-speed section 206 via a conductor 223. A detailed circuit diagram of a specific implementation of the clock section 200 utilizing conventional components is shown in FIG. 8B in which corresponding reference numerals are shown.

The input quadrature signals (see waveforms A & B shown in FIG. 6) are coupled from the inputs 226, 228 to an Exclusive-OR gate circuit 230, as shown, and to a chase logic circuit 232. The output of the Exclusive-OR gate 230 is coupled to the input of the phase locked loop 210 via a conductor 218. The chase logic 232 generates the change of state signal, the direction signal, and a change of direction signal (COD, see waveform D shown in FIG. 6) based on the input signals, and receives next state signals ($NS_1$ and $NS_0$, see waveforms G & H shown in FIG. 6) coupled from the next state section 204. The direction signal is coupled to the clock control logic 212 via the conductors 216 and to the next state section 204 and the vari-speed section 206 via the conductors 234, as shown. A detailed circuit diagram of a specific implementation of the chase section 202 utilizing conventional components is shown in FIG. 8A in which corresponding reference numerals are shown.

The next state section 204 comprises a counter 236 to which are coupled the count up and count down signals from the clock control logic 212. The counter 236 is coupled to a comparator 238 to which is coupled a data selector circuit 240 which couples a selected data value from a match data generating means 242 for generating predetermined match values. The comparator 238 generates a match signal (see waveform F shown in FIG. 6) when the counter value equals the data value from the data selector 240 which is selected based upon the next state signal which is coupled from the next state logic 246, as shown. This match signal is coupled to the state latch 244 and the clock control logic 212, and causes the state latch to load the next state coupled from the next state logic 246 to serve as the new present state. These latched values are then coupled to the next state logic 246 as the present state signals (PS$_1$, PS$_2$, see waveforms I & J shown in FIG. 6). The next state logic 246 determines the next state based upon the direction signal coupled from the conductor 234 and the present state signals coupled from state latch 262, as shown. A detailed circuit diagram of a specific implementation of the next state section 204 utilizing conventional components is shown in FIG. 8C in which corresponding references numerals are shown.

The vari-speed section 206 comprises a counter 250 to which are coupled the count up and count down signals from the clock control logic 212. The counter 250 is coupled to a comparator 252 to which is coupled a data selector circuit 76 which couples a selected data value from a data buffer 256 containing a vari-speed match value loaded from the microcomputer 110. The data buffer 76 is also coupled to the counter 250 via a bus 262 to permit loading of the total count value upon overflow in response to a borrow signal which is fed back to enable the loading of the counter, as shown. The comparator 252 generates a Vmatch signal (see waveform M shown in FIG. 6) when the counter value equals the data value coupled from the data selector 252 which is based upon next state signals coupled from a next state selector logic circuit 258, as shown. The Vmatch signal is coupled to the next state selector logic circuit 258 and to a counter clear logic circuit 260, as shown.

The counter clear logic circuit couples a clear signal to the counter 250 in response to the Vmatch signal, the $\overline{CLK}$ signal coupled to the counter clear logic circuit 260 via a conductor 233, the direction signal coupled to the counter clear logic circuit 260 via a conductor 234 and the vari-speed present state signal (VPS$_1$, VPS$_0$) coupled from the state logic 262. The next state selector logic circuit 258 couples next state signals or present state signals to the data selector 254 in response to the Vmatch signal, and the change of direction signal from the chase logic 232. The vari-speed present state signals (VPS$_1$, VPS$_0$, see waveforms N & O shown in FIG. 6) are coupled from a state latch 262, to the next state selector logic 258 and the vari-speed next state signals (VNS$_1$, VNS$_0$) are coupled from a next state logic circuit 264. The state latch 262 latches the vari-speed present state based upon vari-speed next state signals coupled from the next state logic 264. The next state logic 264 generates the vari-speed next state in response to the direction signal coupled from the conductor 234 and the vari-speed present state coupled from the state latch 262. The vari-speed present state signals are coupled to the outputs 82, 84 as the vari-speed quadrature output signals, as shown. A detailed circuit diagram of a specific embodiment of the vari-speed section 206 utilizing conventional components is shown in FIG. 8D in which corresponding reference numerals are shown.

In operation, the quadrature vari-speed system 80 essentially "chases" the input quadrature signal. The input quadrature signal comprises two input signals IS$_1$, IS$_0$ applied to the inputs 226, 228. These signals are treated as state changes of a system having four possible states, 00, 01, 11, and 10 as seen in this order when moving in a forward direction. The next state section 204 generates present state (PS$_1$ and PS$_0$) and the next state (NS$_1$ and NS$_0$) signals. Based on the present state and the direction in which the system has been moving, a next state is predicted by the next state logic 246. If the change of the input state matches the predicted next state, the chase logic 232 sends a change of state signal (COS) to the clock control logic 212. From the clock control section 212, count signals are coupled to the counter 236, and after a fixed number of counts (250 in the illustrated embodiment), a MATCH signal is generated by the comparator 238. This signal latches the predicted next state into the state latch 244 to serve as the present state. A new next state is predicted by the next state logic 246, and the change of state signal is disabled in response to the next state signals (NS$_1$, NS$_0$) coupled from next state logic 246. The system then waits for a new input state.

A change of the input state that does not match the predicted next state in the chase logic 232 implies a change of direction of the input signals. The chase logic 232 detects this condition, corrects the direction signal (DIR) and sends out a change of direction signal (COD), which is coupled to the last state logic 258 in the vari-speed section 206. As soon as the direction signal changes, a new next state is predicted by the next state logic 246. Since the new predicted next state matches the input state, a change of state signal is generated by the chase logic 232 and the process described above repeats.

The number of clock cycles counted in the next state section by the counter 236 while the change of state signal is active determines the accuracy of the vari-speed section 206. To obtain a three decimal place accuracy, a count match value total of 1000 is used, spread over the four state changes that comprise a quadrature cycle. The match data register 242 stores the four match values of 250, 500, 750, and 1000 (or 000) which correspond to predicted next states of 00, 01, 11, and 10. The data selector 240 couples the proper count value to the comparator 238 based upon the predicted next state signals coupled from the next state logic 246.

The vari-speed section 206 uses the same clock signals as the next state section 204 but by changing the count values at which state changes are latched, the quadrature signal sent out is at a different rate than the incoming quadrature signal. Using a section nearly identical to the next state section 204, the vari-speed section 206 utilizes the same clock signals and direction signals as the next state section 204, but maintains a totally independent present state (VPS$_1$ and VPS$_0$) and next state (VNS$_1$ and VNS$_0$). By counting the same clock signals, the vari-speed section 206 remains locked to the input signal, but counting greater or fewer clock cycles enables a different selected speed of the quadrature signal.

This process allows the system to track the input signal through direction changes and fast wind speeds while generating a different rate of quadrature signal bounded only by the limits of the motors to be driven. The system never has to be reset because the system is always locked to the input quadrature signals with the speed of the output quadrature signals at a fixed ratio to the speed of the input quadrature signals.

The differences between the next state section 204 and the vari-speed 206 section begins at the vari-speed match value in the data buffer 76. The varispeed match values are not a fixed total of 1000 as in the next state section 204, but ranges above and below this value depending on the amount of slow down or speed up of the quadrature signal selected. These values need to be in quarters of the total, $\frac{1}{4}$, $\frac{1}{2}$, $\frac{3}{4}$, and 1. For example, if the output quadrature signal is to be 1.25 time faster than the input, the total vari-speed match value would be 800, and the match values would be 200, 400, 600 and 800 (or zero). Thus, the ratio of the input and output speed is equal to the vari-speed match value total to the ratio of the match value total. The vari-speed match value total is also feed to the parallel load inputs of the counter 250 so that when a rollunder occurs, counting down and crossing the zero point, the proper value is loaded back into the counter 250.

In a similar manner, the counter 250 needs to be cleared when it reaches a count equal to the match value total. The counter clear logic 260 waits for a Vmatch signal to occur at the proper state and direction, then sends a clear signal to the counter 250. The next state section 204 uses decade counters for the counter 236 which handle the rollover and rollunder of the fixed total of 1000 without the need for any additional circuitry.

The other difference between the operation of the next state section and the vari-speed section is in the last state logic 258. The next state section 204 controls the clock and always exactly reaches a state change before disabling the clock. The vari-speed section 206 seldom, if ever, will reach a state change precisely on the last clock cycle before the clock is disabled. If a change of direction occurs, it is necessary for the vari-speed section 206 to re-find the same state it just passed when changing to the other direction. Thus, in response to the change of direction signal from the chase logic 232, the last state logic 258 sends the present state values (VPS$_0$, VPS$_1$) to the data selector 254 until the next match is found.

The system as described above does not have a one for one correspondence between state changes of the input and output. This is necessary in order for a varispeed system to run at a different speed than the input signal. Instead, the output signal will occasionally have no changes of state if the vari-speed is running slower or multiple changes of state if the vari-speed is running faster. This means a jitter in the quadrature signal will be created, which poses no problems when moving at jog or wind speeds but will create an audible flutter at play speeds. By using a phase locked loop 210 in the clock section 200 to track the play speed quadrature signal and generate a higher frequency clock signal (500 times the input P$_{LL}$ signal frequency), this jitter can be eliminated. When the system 80 is in the range of play speed, the clock signal is derived from the phase locked loop 210 which is always active; i.e. there are no pauses waiting for an input state change. The output quadrature signal is then a consistent jitterless signal. The change of state signal, which is normally used to enable and disable the clock, is still used to make a smooth transition between the phase locked loop clock and the high speed clock at the lower boundaries of the play speed zone. The high speed clock is fast enough so that when running at the nominal play speed, the predicted next state is found before the input signal changes state again.

Figure 4B:
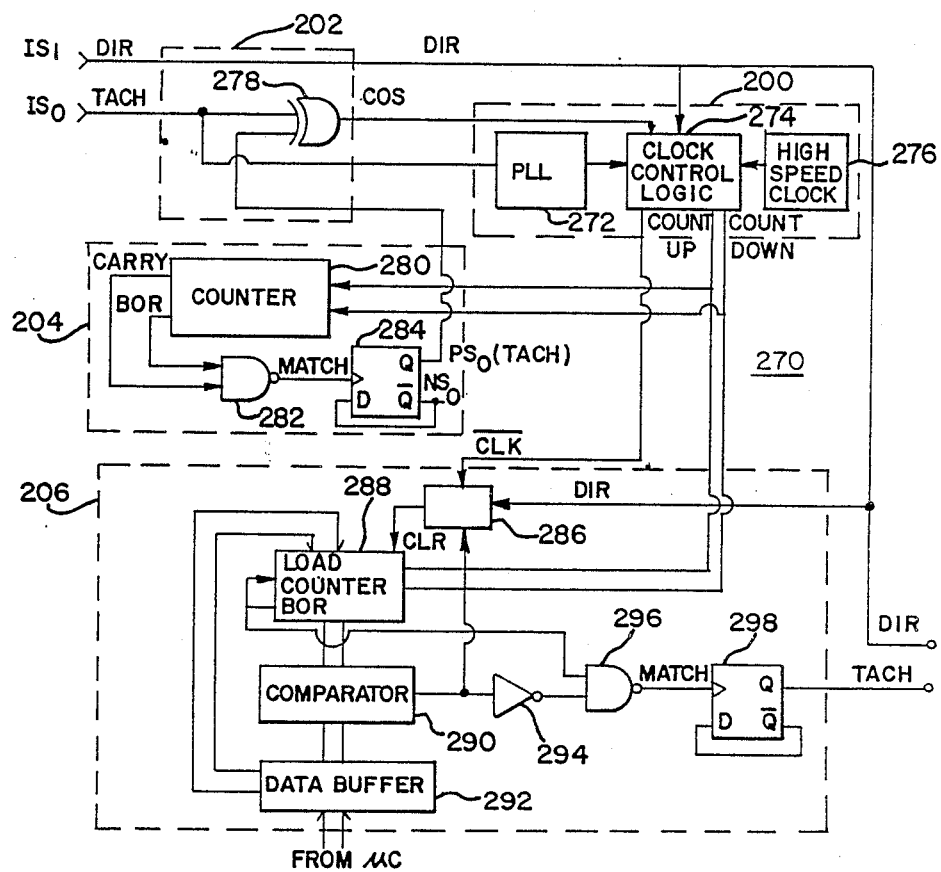
FIG. 4B is a detailed block diagram of a specific embodiment of tachometer and direction variable speed interlock circuitry in accordance with the invention.

As an alternative to the quadrature to tachometer and direction convertor 70, a tachometer and direction signal vari-speed circuit may be utilized instead of the quadrature vari-speed circuit 80. A specific embodiment of such a tachometer and direction vari-speed circuit 270 is illustrated in the detailed block diagram of FIG. 4B. The vari-speed circuit 270 comprises four major blocks, including a chase section 202, a clock section 200, a next state section 204, and a vari-speed section 206, each corresponding to the same blocks of FIG. 4A and configured as shown. The clock section 200 comprises a phase locked loop 272, which couples a phase-locked loop signal to a clock control logic circuit 274, as shown. A change of state signal (COS) and the direction (DIR) from the input signal (IS$_1$) are coupled to the clock control logic 274 from the chase section 202, and an input tachometer signal (TACH) from the input (IS$_0$) is coupled to the phase locked loop 272. A high speed clock signal is coupled from a clock generator 276 to the clock control logic 274. Count-up and count-down signals are output from the clock control logic 274 and are coupled to the next state section 204 and the vari-speed section 206, as shown. A clock signal $\overline{CLK}$ is also coupled from the clock control logic 274 to the vari-speed section 206.

The input tachometer and direction control signals (IS$_1$, IS$_0$) composed of a direction signal (DIR) and a tachometer signal (TACH) are coupled to the chase Exclusive -OR Gate 278 whose output is coupled, as shown, section 202. The chase section 202 comprises to the clock control logic 274. The Exclusive-OR gate 278 functions as a change of state detector generating change state signals (COS) in response to the input tachometer signals and present state signals (PS$_0$) coupled from the next state section 204. The input direction signal (IS$_1$) is coupled to the clock control logic 274, to the varispeed section 206, and to the output, as shown.

The next state section 204 comprises a counter 280 to which are coupled the count-up and count-down signals from the clock control logic 274. The counter 236 has its borrow (BOR) and carry outputs coupled to a NAND gate 282 which has its output coupled to a state latch 284, as shown. The NAND gate functions as a comparator to generate a match signal when the counter counts up or down a predetermined number of counts. The match signal, coupled from the NAND gate 282 to the latch 284, triggers the state latch 284 causing the state latch 284 to load the next state as the new present state. The next state is coupled from the $\overline{Q}$ output of the latch 284 since the next state is merely the inverse of the present state for the tachometer signal. The newly latched present state (PS$_0$) is coupled, as shown, to the Exclusive-OR gate 278 of the chase logic 202.

The vari-speed section 206 comprises a counter 288 to which are coupled the count-up and count-down signals from the clock control logic 274. The counter 288 is coupled to a comparator 290 to which is coupled a data buffer 292 which contains a preselected count total match value loaded from the microcomputer 110. The data buffer 292 is also coupled to the counter 288, as shown, to permit loading of the total count value upon overflow in response to a borrow signal (BOR) which is fed back to enable the loading of the counter 288. The borrow signal is also coupled to a first input of a NAND gate 296. The comparator 290 generates an intermediate match signal when the counter value equals the data total count value coupled from the data buffer 292. This intermediate match signal is coupled through an inverter 294 to the second input of the NAND gate 296, as shown. The NAND gate 296 generates a match signal at its output which is coupled to a state latch 298. The match signal triggers the state latch 298 to load a vari-speed next state value ($VNS_0$) as the new vari-speed present state value ($VPS_0$). This vari-speed present value is coupled to the tachometer output as the vari-speed tachometer output signal, as shown. The intermediate match signal is also coupled to a counter clear logic circuit 286, which generates a clear signal (CLR) in response to the intermediate match signal, the direction signal, and a clock signal ($\overline{CLK}$) which are also coupled to the logic 286, as shown. This clear signal is coupled to the counter 288 to clear the counter after a match occurs when counting up.

In operation, the tachometer and direction varispeed circuit 270 chases the input signals in a manner similar to the operation of the quadrature vari-speed circuit 80. At a given input state, $IS_1$ (DIR) and $IS_2$ (TACH), the system anticipates a change of the tachometer signal. When the change is detected by the Exclusive-OR gate 278, a change of state signal (COS) is coupled to the clock control logic 274. Depending on the direction signal, either the count-up or the count-down clock is enabled and after a fixed number of counts, a match signal is generated by the NAND gate 282 when either an overflow or borrow signal is generated by the counter 280. This match signal latches the incoming next state into the state latch 284, which is coupled to the Exclusive-OR gate 278 disabling the change of state signal. The system then waits for a new input state. If the direction signal changes, the clock section 200 will enable the opposite clock count signal when a change of state signal is received.

The number of clock cycles counted by the counter 280 determines the accuracy of the next state section 204. To obtain three decimal place accuracy, a count total of a thousand (1000) is used in the illustrated embodiment. The vari-speed section 206 uses the same clock signals as the next state section 204, so it remains locked to the input tachometer rate, but counts to a different value between matches. This corresponds to tachometer changes at a different rate than the input signal. By counting greater or fewer clock cycles between matches, the output tachometer rate will be slower or faster.

The next state section 204 of the illustrated embodiment uses a decade counter for the counter 280 and the occurrence of either a carry or a borrow signal indicates a match (counting up to a thousand from zero or down to zero from a thousand). The vari-speed section 206 uses the comparator to find a match and generates the intermediate match signal when counting up. This signal along with the direction signal is also used to generate the clear signal to clear the counter so that it can begin at zero again. The borrow signal indicates a match when counting down. This borrow signal is used to load the count total back into the counter 288.

The vari-speed circuit 270, as illustrated, does not have a one for one correspondence between the state changes of the input and output due to the difference in speed between the input signal and the output vari-speed signal. Instead, the output signal will occasionally have no changes of state if the vari-speed circuit 270 is running slower, or multiple changes of state if the vari-speed circuit 270 is running faster. This means a jitter would be produced in the quadrature signal which poses no problems when moving at jog or wind speeds, but will create an audible flutter at play speeds. By using the phase-locked loop 272 to track the play speed tachometer signal and generate a higher clock signal (e.g., 2000 times the tachometer signal frequency in the illustrated embodiment), this jitter can be eliminated. When the signal is in the range of the play speed, the clock signal is always derived from the phase-locked loop 272 and there are no pauses waiting for the input state change. The output tachometer signal is then a consistent jitterless signal. The change of state signal, which is normally used to enable and disable the clock, is still necessary to make a smooth transition between the phase-locked loop clock and the high speed clock at both boundaries of the play speed zone. The high speed clock is fast enough to guarantee that when running at the highest wind speed, the predicted next state is found before the input signal changes state again.

Figure 5B:
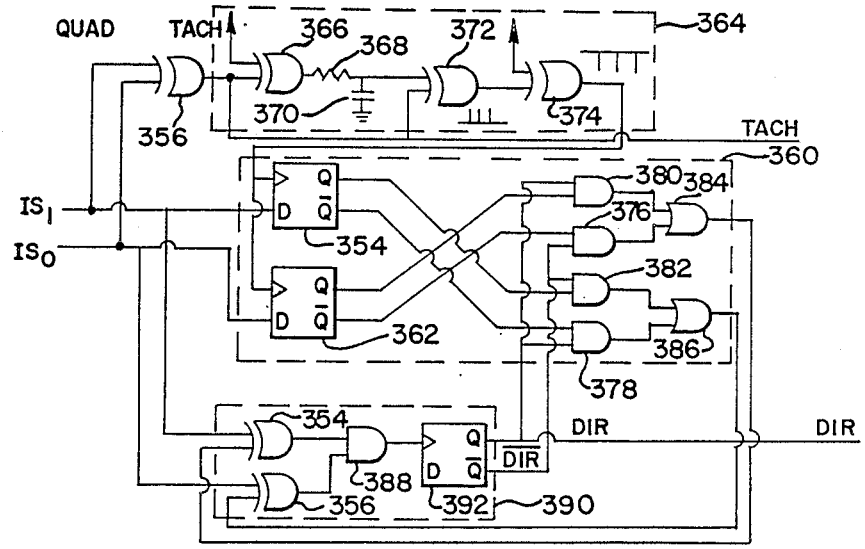
FIG. 5B is a detailed schematic diagram of a specific embodiment of quadrature to tachometer and direction converter circuitry in accordance with the invention.
Figure 5A:
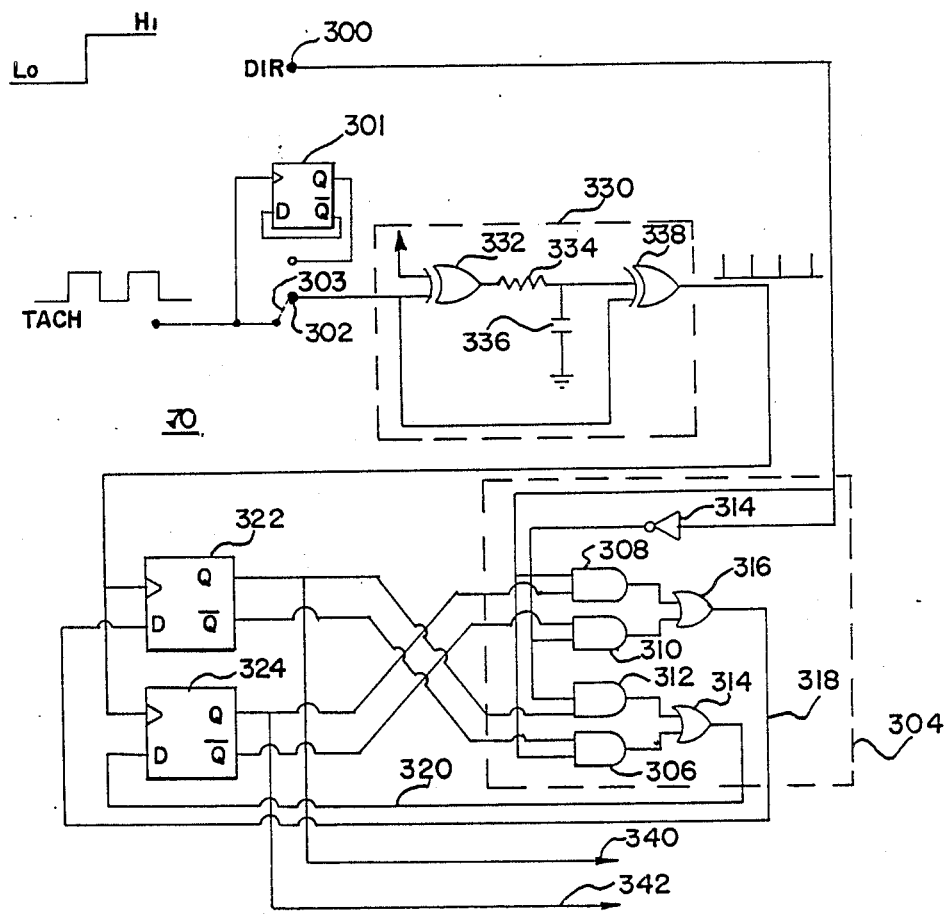
FIG. 5A is a detail schematic diagram of a specific embodiment of the tachometer and direction to quadrature circuitry shown in FIG. 2.

FIG. 5A is a detailed schematic diagram of a specific embodiment of the tachometer and direction to quadrature signal convertor 70 shown in FIG. 2. Tachometer and direction signals to be converted to quadrature signals are coupled to a direction (DIR) signal input 300 and a tachometer (TACH) signal input 302. The direction signal, which is a high or low voltage to indicate forward or reverse direction, as shown, is coupled to a next state logic circuit 304. Within the next state logic circuit 304, the direction signal is coupled to one input of each of the AND gates 306 and 308, and is coupled to one input of each of the AND gate 310, 312 after inversion by an inverter 314. The outputs of the AND gates 306, 308, 310, 312 of the next state logic 304 are coupled to OR gates 314, 316, as shown, to produce next state signals. The next state signals are coupled via conductors 318, 320 to the D inputs of two D flip-flops 322, 324, as shown. The D flip-flops 322, 324 function as present state latches for latching the predicated next state to be used as the present state.

The tachometer signal, which is a rectangular waveform with a frequency corresponding to the speed at which the film transport device is driven, is coupled either directly to the input 302 or through a flip-flop 301 depending upon the position of a jumper 303. The jumper 303 may be placed as shown, thereby coupling tachometer signals directly to input 302 or it may be placed across the terminal 305 and 302 which couples the tachometer signal through the flip-flop 301. In the configuration which includes the flip-flop 301, the signals are divided by two to ensure that the tachometer signal will have a 90% duty cycle. In this configuration, a factor of two is introduced into associated microcomputer calculations of the ratio of the speed of incoming and output signals. Thus, since the input signal to the converter 70 is reduced in speed by one half, the ratio of input to output for the system 12 must be increased by a factor of two to maintain the proper speed of the output signals.

The resulting tachometer signal in either case is coupled from the input 302 to one input of an Exclusive-OR gate 332 of a timing pulse generator 330, as shown. The second input of the Exclusive-OR gate 332 is coupled to a high level while the output is coupled to a differentiating network comprising a resistor 334 and a capacitor 336. The output of the differentiating network is coupled to one input of an Exclusive-OR gate 338 while the tachometer signal is coupled directly to the second input of the Exclusive-OR gate 338. The resulting output of the Exclusive-OR gate 338 is a set of timing pulses, as shown, having a pulse for each edge of the tachometer signal. This timing signal is coupled, as shown, to the clock inputs of the D-flip flops 322, 324. The $\overline{Q}$ output of the flip flop 322 is coupled to the AND gate 306, and the $\overline{Q}$ output of the flip flop 324 is coupled to the AND gate 310, as shown. The Q output of the flip flop 322 is coupled to the AND gate 312 and to an output 340, while the Q output of the flip flop 324 is coupled to the AND gate 308 and to an output 342.

In operation, the AND-OR gate logic of the next state circuit 304 generates a predicted next state quadrature signal based upon the direction signal and a present state coupled from the flip flops 322, 324. Each time a pulse is generated by the timing pulse generator 330 (i.e., upon each edge of the tachometer signal), the D-flip-flops latch in the predicted next state of the quadrature signal from the next state logic 304. The newly latched state then serves as the present state until the next edge pulse is generated, and is output as the output quadrature signal on outputs 340, 342, as well as being coupled to the next state logic for use in predicting the next state.

A quadrature to tachometer and direction converter, together with a tachometer and direction vari-speed circuit and a tachometer and direction to quadrature converter may be used as an alternative to a quadrature vari-speed circuit. Thus, in FIG. 2, the system 12 may be configured with a tachometer and direction vari-speed 270 in place of the quadrature vari-speed 80, a quadrature to tachometer and direction converter in place of the tachometer and direction to quadrature converter 70, and a tachometer and direction to quadrature converter 70 in place of the Exclusive-OR gate 90. A specific embodiment of a suitable quadrature to tachometer and direction converter 350 is illustrated in the detail schematic diagram of FIG. 5B. The quadrature signals to be converted ($IS_1$ and $IS_0$) to tachometer and direction signals are coupled directly to an Exclusive-OR gate 352 and to a set of latches 358 and 362 of a next state circuit 360, as shown.

The Exclusive-OR gate 352 converts the two quadrature input signals to a tachometer (TACH) signal which is coupled to a one input of an Exclusive-OR gate 366 of a timing pulse generator 364, as well as to a tachometer signal output, as shown. The Exclusive-OR gate 356 is configured as an inverter and is coupled to a differentiating network comprising a resistor 368 and a capacitor 370. The output of the differentiating network is coupled to one input of an Exclusive-OR gate 372 while the tachometer signal is coupled directly to the second input of the Exclusive-OR gate 372. The output of the Exclusive-OR gate 372 is a set of timing pulses which are inverted by an Exclusive-OR gate 374 and coupled to the clock input of the latches 354 and 362, as shown. The $\overline{Q}$ output of the latch 362 is coupled to an AND gate 376 and the $\overline{Q}$ output of the latch 354 is coupled to an AND gate 378, as shown. The Q output of the latch 362 is coupled to an AND gate 380, and the Q output of the latch 354 is coupled to an AND gate 382. The outputs of the AND gates 376, 378, 380 and 382 are coupled to OR gates 384 and 386, as shown.

The quadrature inputs are also coupled directly to a set of Exclusive-OR gates 354 and 356, as shown. The outputs of the OR gates 384 and 386 ($NS_1$, $NS_0$), are also coupled respectively to the Exclusive-OR gates 354 and 356. The outputs of the Exclusive-OR gates 354 and 356 are coupled to an AND gate 388, which has its output coupled to the clock input of a latch 392. The resulting circuit composed of the Exclusive-OR gates 354, and 356, the AND gate 388, and the latch 392 is a change of direction detector 360, which generates direction signals (DIR, $\overline{DIR}$). The noninverted direction signal was coupled to the AND gates 378 and 380, as well as to a direction signal output, as shown. The inverted direction signal is coupled to the AND gates 382 and 376, as shown.

In operation, the Exclusive-OR gate 352 converts the quadrature signals to a tachometer signal which is then coupled to the tachometer signal output as well as being converted to timing signals for the next state logic circuit 360. The next state logic 360 generates predicted next state quadrature signals ($NS_1$, $NS_0$), which are utilized along with the input quadrature signals ($IS_0$, $IS_1$) by the change of direction detector 390. The change of direction detector 390 compares the input quadrature signals and the predicted next state signals and changes the direction signal when the predicted next state does not match the new input quadrature state. The direction signal is then used by the next state logic to predict the next state and is also used as the output direction signal.

FIG. 6 is an illustration of a set of waveforms generated at various points in the quadrature vari-speed circuit of FIG. 4. It should be noted that the waveforms of FIG. 6 are based upon a match data value (in match data register 242 of FIG. 4) of 1000 and upon a vari-speed data value (in the data buffer 256 of FIG. 4) of 800. Thus, each pulse of waveforms K and L contain 250 clock cycles while there are 200 clock cycles between state changes within the vari-speed section. Thus, the ratio between the speed of the $VPS_0$, and $VPS_0$ (waveforms N and O) output quadrature signals to the speed of the $IS_1$ and $IS_0$ (waveforms A and B) input quadrature signals is 1.25.

Figure 7A:
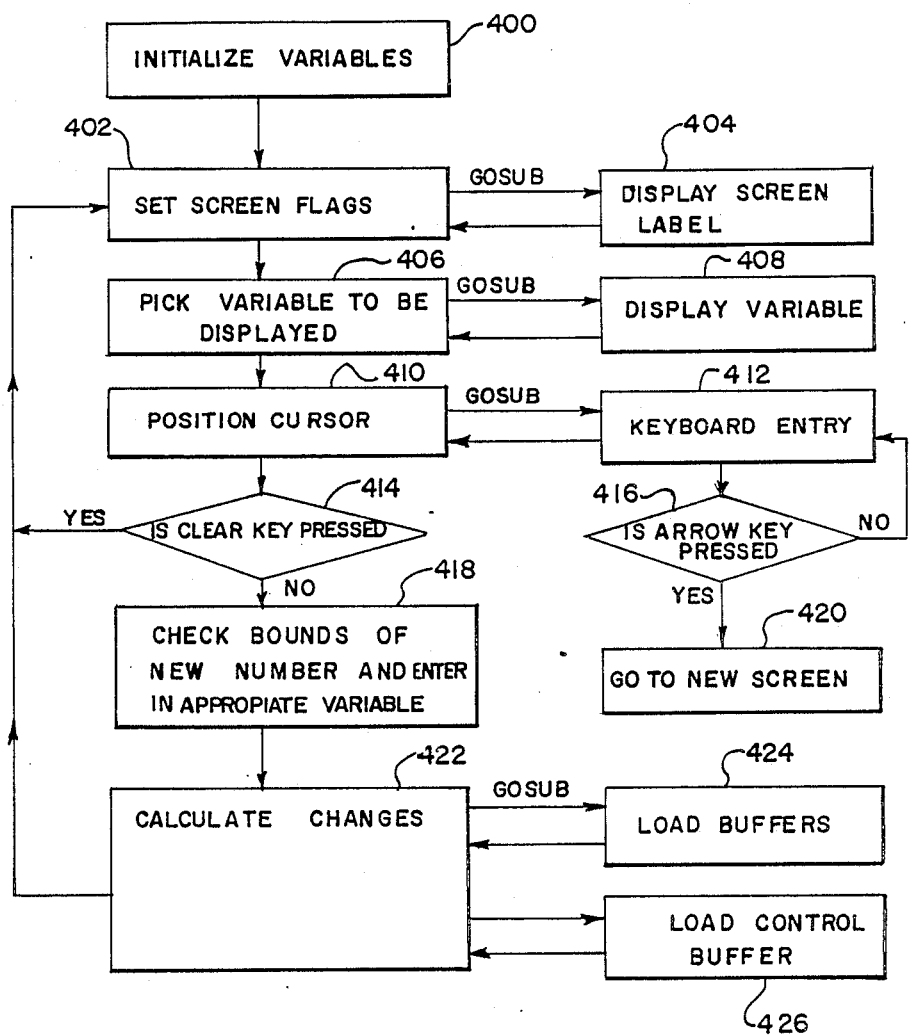
FIG. 7A is a generalized flow diagram of a specific embodiment of a program for the microcomputer shown in FIG. 2.

Referring now to FIG. 7A, there is shown a flow diagram of a specific embodiment of a program for the control of data entry and display by the microcomputer logic 110. The program begins with initialization of variables such as default values and flags, as indicated at block 400, after which screen flags are set based upon the default values, as indicated at block 402. From block 402, program control branches to block 404 to display the screen labels after which program control returns to block 402 and proceeds to block 406. As indicated by block 406, the variables to be displayed are determined based on the screen selected and then program control branches to block 408 for display of the variables. The program flow then branches to block 410 where the cursor is positioned to set up entry of data from the keyboard after which program control proceeds to block 412 for entry of data from the keyboard. The system waits for some entry from the keyboard, otherwise the existing screen and data are displayed. As indicated at block 416, if an arrow (i.e., up or down arrow) is pressed, indicating a change to a new screen, program control branches to a new screen, as indicated at block 420. A branch to a new screen results in new screen flags being set and the program sequence begins a new screen sequence again at block 402. If the arrow key has not been pressed, program control returns to block 412 and the data may be entered unless the clear key is pressed. As indicated at 414, if the clear key is pressed processing flow branches back to block 402 to start the screen sequence over for the selected screen. If the clear key is not pressed, the new data is to be entered, so program control proceeds to block 418 when the bounds of the new data value are checked and then stored. Then the necessary changes to the screen, displayed LEDs and the vari-speed match value are calculated. Once calculated the data buffer is loaded with the new vari-speed value as indicated at block 424 and the control buffer 60 is loaded with the new values for control of the display LED's as indicated at block 426. Once the sequence is completed, the program control branches back to the beginning of the screen display sequence at block 402.

FIG. 7B shows a flow diagram illustrating a specific embodiment of a quadrature generation routine for the microcomputer logic 110. The routine begins when a request to locate a cue point generated from the front panel 160 is received, as illustrated by block 430. Subsequently, the data selector 56, 94 is set to couple the computer generated quadrature to the input of the vari-speed circuit 80 or directly to the output of the system 12, depending upon whether the system is in the vari-speed mode or not, as shown by block 432. A decision is then performed to determined whether the system location count (a quadrature pulse count indicating the present location of the system) is greater than the selected cue locating count and if affirmative (i.e., indicating the system is beyond the cue point), process control branches to block 436 for output of the next reverse direction quadrature state to move the control transport devices in reverse toward the cue point. This is followed by decrementing the location count as illustrated by block 438 after which process control returns to block 434, as shown. This loop will continue until the reverse quadrature signals have moved the desired transport control device to the cue point.

If the result at block 434 is negative, a second decision is performed to determine whether the value of the system location count is less than the value of the variable cue, as illustrated at block 440 and if the result is affirmative, the process control branches to block 442 for output of the next forward quadrature state of the quadrature signal. The location count is then incremented as illustrated by block 444, and process control returns to block 434, as shown. If the result at block 440 is negative, the data selector is reset to its previous state as illustrated at block 446, and then the routine is exited, as illustrated by block 448.

FIGS. 8A, 8B, 8C and 8D are detailed schematic circuit diagrams of a specific embodiment of the circuitry shown in block diagram form in FIG. 4 utilizing conventional components. Reference numerals are shown corresponding to those shown in FIG. 4.

Specific embodiments of the variable speed film transport interlock system according to the invention has been described for purposes of illustrating the manner in which the invention may be made and used. It should be understood that implementation of other variations and modifications of the invention in its various aspects will be apparent to those skilled in the art, and that the invention is not limited by the specific embodiments described. It is therefore contemplated to cover by the present invention any and all underlying modifications, variations, or equivalents that fall within the true spirit and scope of the basic underlying principles disclosed and claimed herein.

What is claimed is:

1. A variable speed film transport control system for controlling a plurality of film transport devices, comprising:
    means for generating standard film transport control signals of a selected speed to control film transport devices;
    microcomputer for generating predetermined computed quadrature film transport control signals of a selected speed;
    means for selecting one of the standard film transport control signals and the computer quadrature film transport control signals to produce selected film transport signals having a selected characteristic speed;
    means for processing the selected film transport control signals to generate processed transport control signals having a selected speed different than the characteristic speed while maintaining synchronization with the selected film transport control signals; and
    means for coupling the selected film transport control signals to at least one selected film transport device to drive said device at the characteristic speed and for coupling the processed transport control signals to at least one other selected film transport device driving said other device at the selected speed.

2. The variable speed film transport control system of claim 1 further comprising a microcomputer controlled keyboard and display control interface which includes means for permitting operator selection of a cue point and means for permitting operator activation of a search for the cue point by activating the selection means to select the computed quadrature film transport control signals.

3. The variable speed film transport control system of claim 1 wherein the means for processing is adapted to process input tachometer and direction drive signals of a speed corresponding to a standard frame rate and generate tachometer and direction drive signals of a selected different speed corresponding to a different selected frame rate.

4. The variable speed film transport control system of claim 3 further comprising conversion means for converting quadrature drive signals to tachometer and direction signals for processing by the processing means, and means for converting tachometer and direction drive signals to quadrature drive signals for driving film transport devices.

5. The variable speed film transport control system of claim 1 wherein the selected film transport signals are quadrature signals of a speed corresponding to a standard frame rate and the means for processing processes the quadrature drive signals and generates quadrature drive signals of a selected different speed corresponding to a different selected frame rate.

6. The variable speed film transport control system of claim 5 wherein the means for processing maintains a fixed ratio between the standard frame rate speed and the selected different speed.

7. The variable speed film transport control system of claim 5 further comprising conversion means for converting tachometer and direction drive signals to quadrature signals for processing by the processing means, and means for converting quadrature drive signals to tachometer and direction drive signals for driving film transport devices.

8. The variable speed film transport control system of claim 5 wherein the means for processing comprises chase means for detecting changes of state and for detecting a direction of the input quadrature signals and for generating change of state and direction signals in response thereto, clock means for generating clock signals in response to the change of state and direction signals, next state generating means for generating next quadrature state signals in response to the clock signals and the direction signals and for coupling the next quadrature state signals to the chase means, and means for generating the quadrature drive signals of the selected different speed in response to the clock signals, and direction signals, and based upon a selected value coupled to the means for generating.

9. The variable speed film transport control system of claim 8 further comprising means for alternating two different selected values to obtain increased accuracy.

10. A variable speed film transport control system for controlling a plurality of film transport devices, comprising:
means for input of first film transport control signals of a selected characteristic speed and direction for control of film transport devices;
means for generating second film transport control signals of a selected characteristic speed and direction for control of film transport devices; and
means for selection of one of the first and second film transport control signals to provide selected film transport control signals;
means for processing the selected film transport control signals to generate processed transport control signals having a selected speed which is maintained at a fixed ratio to the characteristic speed and having the same direction as the selected film transport control signals.

11. The variable speed film transport control system of claim 10 wherein the means for processing comprises means for processing quadrature transport control signals and for processing tachometer and direction transport control signals.

12. The variable speed film transport control system of claim 10 further comprising means for providing a plurality of selectable inputs.

13. The variable speed film transport control system of claim 10 further comprising means for selectively reversing the direction of the processed transport control signals.

14. The variable speed film transport control system of claim 10 further comprising a microprocessor for generating the second film transport control signals and means for selectively coupling the second film transport control signals to an output to provide system output signals.

15. The variable speed film transport control system of claim 10 wherein the first film transport control signals are tachometer and direction signals, said system further comprising conversion means for converting the tachometer and direction signals to quadrature signals for processing by the processing means.

16. The variable speed film transport control system of claim 15 wherein the conversion means comprises a divide by two circuit means for dividing the tachometer signal by two before conversion.

17. A method for controlling a plurality of film transport devices comprising the steps of:
selecting first film transport control signals at a first selected speed and direction from input film transport control signals from a film transport control device and microprocessor generated film transport control signals;
processing the first film transport control signals to generate processed transport control signals having a second selected speed, the processed transport control signals synchronized with the film transport signals of the first selected speed and having the same direction as the first film transport control signals.

18. The method of claim 17 wherein the step of processing comprises maintaining a fixed ratio between the speed of the first film transport control signals and the speed of the processed transport control signals.

19. The method of claim 18 wherein the step of processing comprises processing quadrature drive signals corresponding to a first speed to generate processed quadrature drive signals corresponding to a second selected speed.

20. The method of claim 19 further comprising the steps of converting tachometer and direction drive signals to quadrature signals for processing and converting the processed quadrature drive signals to tachometer and direction drive signals for coupling to at least one selected film transport device.

21. The method of claim 20 wherein the step of converting tachometer and direction drive signals to quadrature signals comprises the steps of:
dividing the tachometer signal by a factor of two to produce divided tachometer signals;
generating a predicted next quadrature state in response to the direction signals and a present quadrature state;
generating trigger signals in response to the divided tachometer signals;
latching the predicted next quadrature state into a latch in response to the trigger signals to generate a present quadrature state to serve as the quadrature signal.

22. The method of claim 20 wherein the step of converting the processed quadrature drive signals to tachometer and direction signals comprises the step of performing an Exclusive-OR function on the processed quadrature signals to generate tachometer signals.

23. A tachometer and direction film transport drive signal to quadrature signal converter comprising:
means for input of a drive signal comprising a tachometer signal and a direction signal including a divide by two circuits which divides the tachometer signals generating a divided tachometer signal;
next state means for generating a predicted next quadrature state in response to the direction signal and a present quadrature state;
means for generating trigger signals in response to the divided tachometer signals;
means for latching the predicted next state into a latch in response to the trigger signal to generate a present quadrature state and for coupling the present quadrature state to the next state means;
means for coupling to present quadrature state to an output to provide output quadrature signals.

* * * * *